United States Patent [19]

Tamagaki et al.

[11] Patent Number: 5,070,360
[45] Date of Patent: Dec. 3, 1991

[54] COPYING MACHINE WITH A SLIDEFILM EXPOSURE DEVICE

[75] Inventors: Akira Tamagaki, Soraku; Shougo Iwai, Moriyama, both of Japan

[73] Assignee: Sharp Kabushiki Kaisha, Osaka, Japan

[21] Appl. No.: 631,689

[22] Filed: Dec. 21, 1990

[30] Foreign Application Priority Data

Dec. 27, 1989 [JP] Japan ............................. 1-340492
Dec. 28, 1989 [JP] Japan ............................. 1-344224

[51] Int. Cl.$^5$ ............................................. G03B 27/52
[52] U.S. Cl. ...................................... 355/40; 355/43; 355/51; 355/244
[58] Field of Search ............... 355/40, 43, 51, 244, 355/311, 313

[56] References Cited

U.S. PATENT DOCUMENTS

| | | | |
|---|---|---|---|
| 3,523,725 | 8/1970 | Schaeffer | 355/244 |
| 3,833,296 | 9/1974 | Vola et al. | 355/51 |
| 3,957,368 | 5/1976 | Goshima et al. | 355/51 X |
| 3,988,063 | 10/1976 | McNair et al. | 355/40 |
| 4,059,355 | 11/1977 | Fritsch | 355/43 |
| 4,077,714 | 3/1978 | Komori et al. | 355/51 |
| 4,080,064 | 3/1978 | Komori et al. | 355/51 |
| 4,110,030 | 8/1978 | Knechtel | 355/311 |
| 4,247,192 | 1/1981 | Komori et al. | 355/66 X |
| 4,537,497 | 8/1985 | Masuda | 355/313 |

*Primary Examiner*—Richard A. Wintercorn
*Attorney, Agent, or Firm*—David G. Conlin; Robert F. O'Connell

[57] ABSTRACT

A copying machine which projects a light image from different documents placed at different places onto the same exposure section in the photosensitive material along the respective different optical axes, thereby facilitating the changeover of the documents with the initially set optical axes being kept.

2 Claims, 4 Drawing Sheets

COPYING MACHINE WITH A SLIDEFILM EXPOSURE DEVICE

BACKGROUND OF THE INVENTION

1. Field of the invention:

The present invention relates generally to a copying machine which forms an image on a photosensitive material by directing a light image from a document, and more particularly to a copying machine wherein a light image from different documents placed at different places are directed onto the same exposure section in the photosensitive material along the respective different optical axes.

2. Description of the prior art

In general, copying machines fall roughly into two types; a first type is one in which an optical image is projected on a photosensitive drum of electrical conductivity previously charged, and the resulting latent image is developed with toner, followed by the transfer of the toner image onto a paper. A second type is one in which an optical image is projected onto a photosensitive sheet coated with photosetting microcapsules containing chromogenic materials to form a latent image by selectively hardened microcapsules. The photosensitive sheet is then pressed thereby rupturing unhardened microcapsules and allowing the chromogenic materials in the capsules to flow therefrom.

When different kinds of documents are copied, for example, one document being a normal paper with prints upon which light is reflected, and other being a slidefilm through which light is transmitted to obtain optical images, respectively, two optical systems are employed to expose the respective documents with the optical axes being partly shared by the two optical systems to guide optical images to the same exposure section. Solutions are proposed; Example (1) is disclosed in Japanese Laid-Open Patent Publication Nos. 58-182629 and 59-198442. They disclose a system under which a Fresnel lens, a screen and the like are placed on a document table through which light rays transmitted through a slidefilm are projected, and the projected light rays are directed to the exposure section by an optical system housed in the copying machine. Example (2) is disclosed in Japanese Laid-Open Patent Publication No. 54-103023, under which a mirror is switched so as to guide light images from different documents to the same exposure section along the same optical axis.

In general, when light rays transmitted through slidefilms are directed to a photosensitive material so as to form an image, the whole surface of the slidefilm is illuminated by light rays from a light source and a slit is disposed in place on an optical path along which the transmitted light rays are directed to the photosensitive material so as to attain a slit exposure effect at an exposure section of the photosensitive material.

The known copying machines mentioned above are disadvantageous; in Example (1) the Fresnel lens, the screen, etc., have to be mounted on the document table when a slidefilm is copied and they have to be removed when a normal document is copied, thereby involving manual difficulty in switching the copy modes between the normal document and the slidefilm. Furthermore, a space is required to house the Fresnel lens, the screen, etc. when they are not used.

In Example (2), the optical axis along which the light image is directed to the exposure section must be changed by switching the mirror. It is difficult to achieve the timely and exact mirror switching and angular adjustment. The optical axis is likely to deviate.

If the slidefilm is subjected to constant exposure, it is likely to discolor and/or deteriorate owing to heat which is built up by the projecting devices.

SUMMARY OF THE INVENTION

The copying machine of this invention, which overcomes the above-discussed and numerous other disadvantages and deficiencies of the prior art, comprises a first exposure optical system having a first optical axis along which an optical image is directed from a first document to an exposure section, a second exposure optical system having a second optical axis along which an optical image is directed from a second document to said exposure section, and means for selecting either said first exposure optical system or said second exposure optical system, the first exposure optical system being disposed so that the first optical axis forms the same angle against the first document as against a photosensitive material at the exposure section, the second exposure optical system being disposed so that the second optical axis is at the same angle to the second document and the photosensitive material placed at the exposure section.

In a preferred embodiment, the copying machine of this invention further includes a slidefilm exposure device having a slit disposed between a light source and a slidefilm, and means for supporting said slidefilm or slit so that it is transversely movable.

Thus, the invention described herein makes possible the objectives of (1) providing a copying machine having a plurality of optical systems capable of easily switching copy modes for different documents without the possibility of deviation of the optical axis, and (2) providing a copying machine equipped with a slidefilm projecting device in which the slidefilm is prevented from constant irradiation with light so as to avoid the build-up of heat.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

Figure 1:
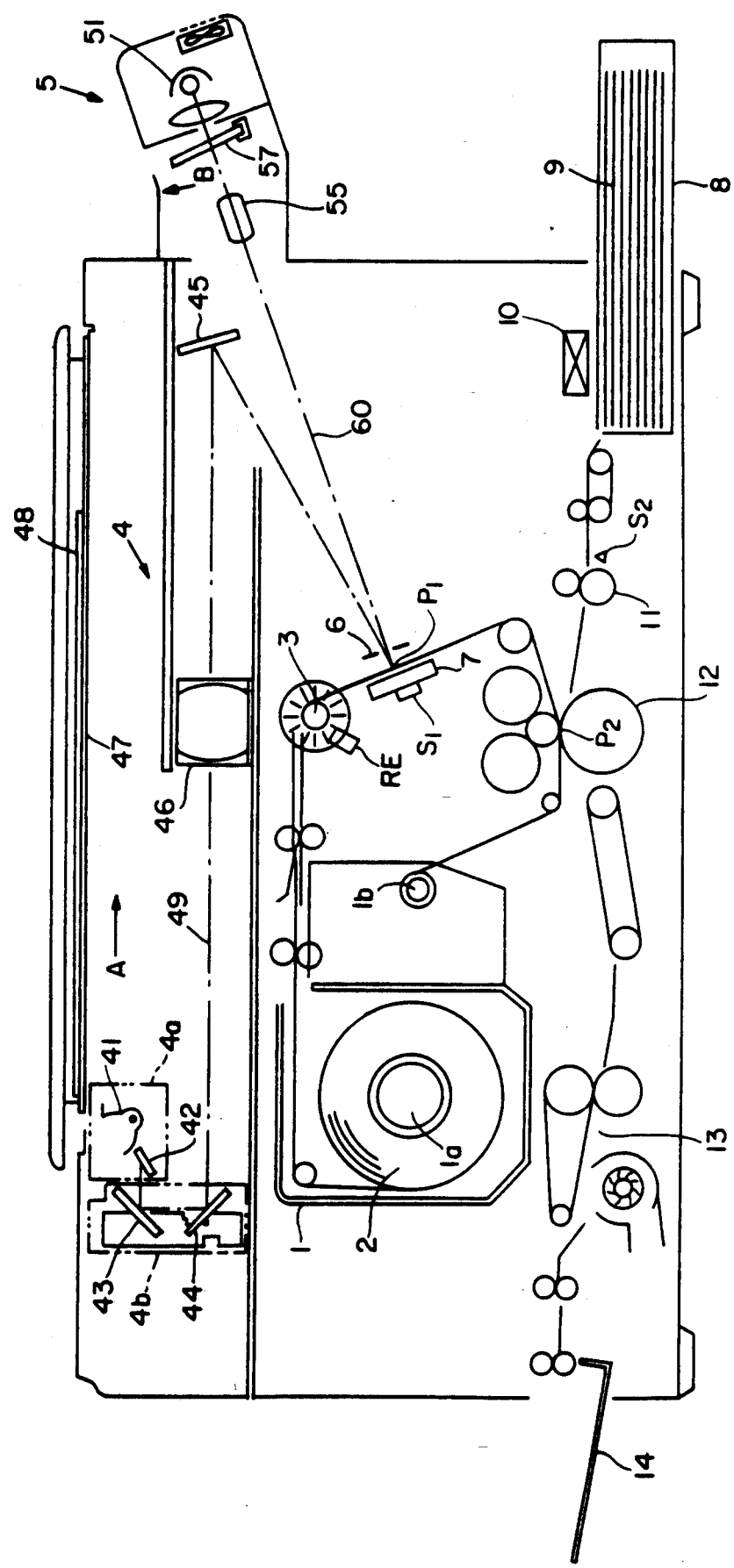
FIG. 1 is a schematic sectional view showing a copying machine of this invention.

Referring to FIG. 1, the copying machine of this invention uses a photosensitive sheet formed of an aluminum film coated with photosensitive and pressuresensitive microcapsules containing chromogenic materials. Such a photosensitive sheet is the same as those described in Japanese Laid-Open Patent Publication Nos. 58-88739 and 59-30539. The microcapsules, when exposed to light, are hardened and not ruptured by pressure, while those not exposed to light are ruptured by pressure releasing the contained chromogenic materials. When the photosensitive sheet is pressed, it is superimposed on an image receiving sheet, and thus the released chromogenic materials flow onto the image-receiving sheet. The chromogenic materials give colors by reaction with developing materials previously applied on the image-receiving sheet.

In FIG. 1, to the left of the middle part of the copying machine is mounted a cartridge 1 detachable with respect to the copying machine. The cartridge 1 includes a sheet supply shaft 1a and a takeup shaft 1b, the sheet supply shaft 1a having a fresh photosensitive sheet 2 wound thereon. The photosensitive sheet 2 is drawn out from the sheet supply shaft 1a and passes the part of image forming process including a transporting roller 3, an exposure section P1 and a pressure developing section P2 before being taken up on the takeup shaft 1b. When the photosensitive sheet 2 on the sheet supply shaft 1a is used up, the cartridge 1 with the used photosensitive sheet on the takeup shaft 1b is replaced with new one.

Onto the exposure section P1 is directed an optical image from a first exposure optical system 4 on the upper surface of the copying machine or from a second exposure optical system 5 on the right side of the copying machine.

Figure 2:
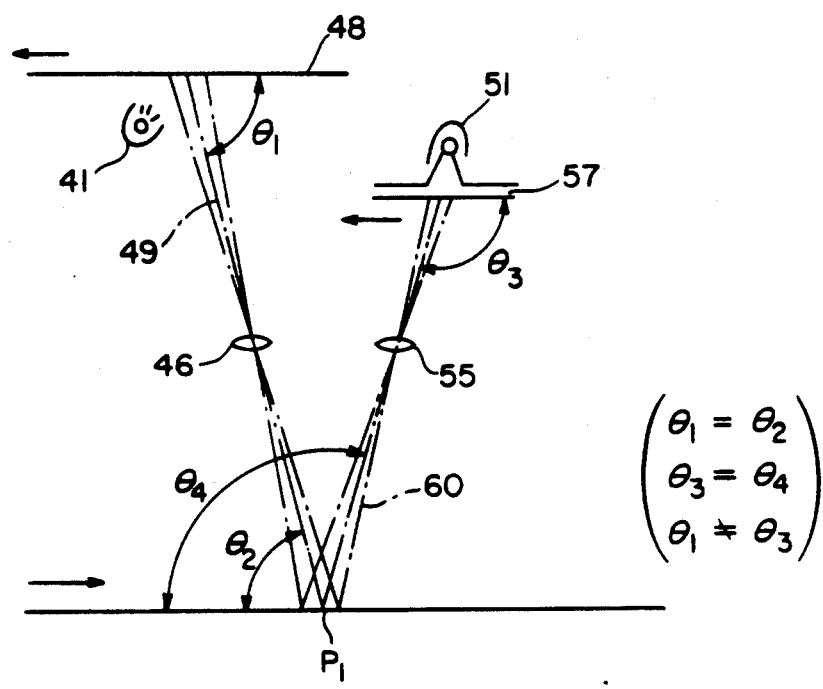
FIG. 2 is a diagram illustrating exposure conditions of the copying machine of FIG. 1.

The first exposure optical system 4 comprising a light source 41, mirrors 42–45 and a zoom lens 46 guides onto the exposure section P1 light reflected from a document 48 placed on a document table 47 mounted on the upper surface of the copying machine. The zoom lens 46 is provided with a color adjustment filter to adjust colors of a formed image. The light source 41 and mirror 42 are supported by a mirror unit 4a and the mirrors 43, 44 by a mirror unit 4b. These mirror units 4a, 4b move in the direction of the arrow A shown in FIG. 1, scanning the document 48 on the document table 47. The light reflected from the document 48 is transmitted via the mirrors 42–45 and the zoom lens 46 to the exposure section P1 as shown in the one-dot chain line in FIG. 1. When the angle formed by the document 48 on the document table and the optical axis of the reflecting light is denoted as $\theta_1$ and the angle formed by the photosensitive sheet 2 and the optical axis of the reflecting light of the document as $\theta_2$, $\theta_1$ is set equal to $\theta_2$. FIG. 2 is a diagram of the exposure conditions showing that the angle $\theta_1$ formed by the document 48 and the optical axis 49 and the angle $\theta_2$ formed by the photosensitive sheet 2 and the optical axis 49 are equal. This setting can prevent a projected image (latent image) from being distorted. As the photosensitive sheet 2 is exposed to light through a slit, there is little worry about being out of focus and therefore having image deterioration.

Figure 3:
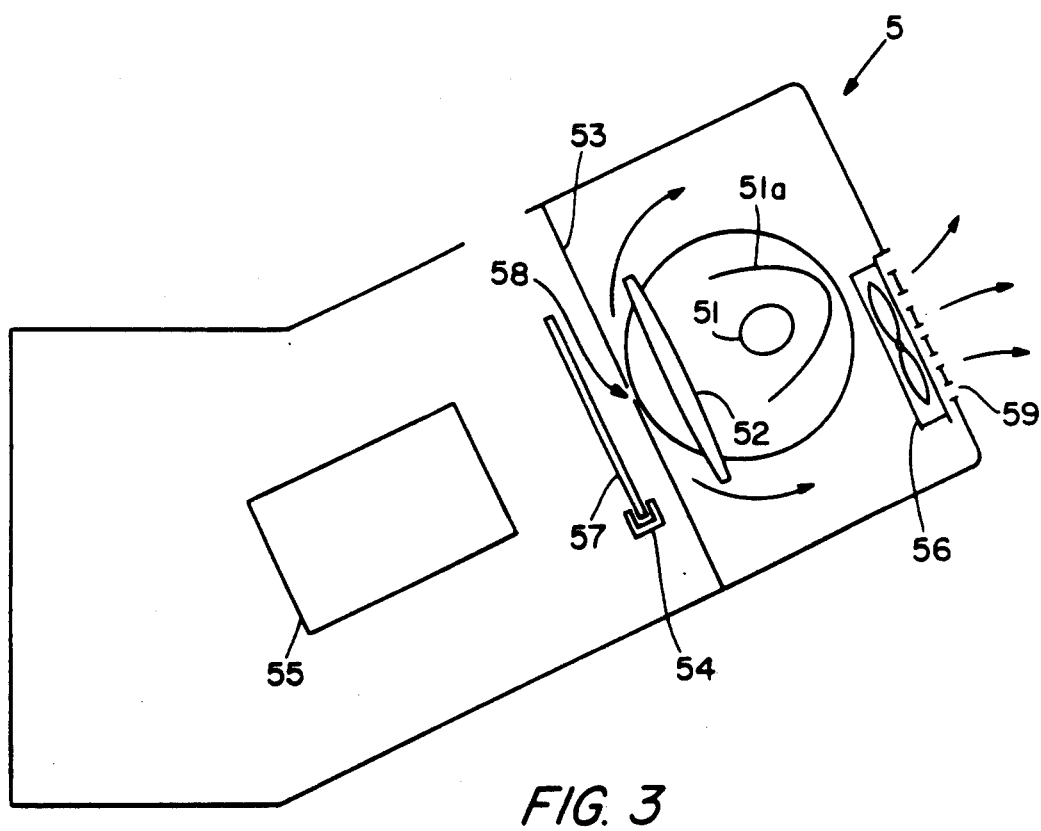
FIG. 3 is an enlarged structural view of a slidefilm exposure device used in the copying machine of FIG. 1.

The second exposure optical system 5 is an optical system directing transmitted light from a slidefilm onto the exposure section P1. FIG. 3 is an enlarged diagram of the system. The second exposure optical system 5 contains a light source 51, a converging lens 52, a slit 53, a slide holder 54 and a lens 55. A cooling fan 56 is disposed behind the light source 51. A slidefilm 57 is inserted to the slide holder 54 from a film insertion opening 58 located in the upper side thereof. Light from the light source 51 is projected on the slidefilm 57 via the converging lens 52 and the slit 53, and the transmitted light through the slidefilm is focused on the exposure section P1 via the lens 55. The slidefilm 57 slides in the direction of the arrow B shown in FIG. 1, thereby the position thereof illuminated by the light being moved and the whole area of the slidefilm being scanned.

In FIG. 2, the slidefilm 57 is placed at the angle $\theta_3$ against an optical axis 60 formed between the light source 51 and the exposure section P1. Meanwhile, the angle of the photosensitive sheet 2 against the axis 60 is set to $\theta_4$. In this case, $\theta_3$ and $\theta_4$ are set equal. By this setting, similarly to the former case of light reflected from the document, light through the slidefilm 57 is focused on the exposure section P1 without distortion, and, as the photosensitive sheet 2 is exposed to light through a slit, there is little worry about being out of focus.

It is undesirable to expose the slidefilm 57 to heating for a long time. This may cause discoloration and deterioration. To prevent these troubles, this optical system is provided with various measures as follows. (1) When the light source 51 is switched on, the cooling fan 56 starts to operate and emits heat generated by the light source 51 outside the system. When the cooling fan 56 operates, air currents pass through the insertion opening 58 to an exhaust duct 59 passing through the slit 53 and around the light source 51, emitting out the heat around the light source 51. (2) The converging lens 52 is covered with infrared-free coating to minimize the amount of heat transmitted from the light source 51 to the slidefilm and thus to prevent temperature rise of the slidefilm. (3) The slit 53 intercept light from the light source 51 to the slidefilm 57 to prevent the slidefilm from unnecessary constant exposure to light. By the slit exposure, only the illuminated portion on the slide film is scanned in order. In conventional methods, however, the whole surface of the slidefilm is continuously illuminated by light, receiving a large amount of heat. In this embodiment, only the necessary portion of the slidefilm is illuminated, thus preventing discoloration and deterioration of the slidefilm caused by receiving an excessive amount of heat. The surface of the slit 53 facing the light source may be coated with a light absorbing material. (4) A reflector 51a is provided half-surrounding the light source 51 to concentrate light on the side of slidefilm 57, thereby effectively using light from the light source 51 and decreasing the amount of light generated by the light source 51 itself.

A heater 7 is disposed on the back side of the exposure section P1 to heat the photosensitive sheet 2. This heating prevents the microcapsules of the photosensitive sheet 2 from changing their hardened conditions depending on an ambient temperature change. The reference numeral S1 denotes a sensor to detect temperature changes of the heater 7 and controls on/off of the heater 7 depending on the detected data. The controlled temperature is normally within the range of 35° C.–40° C. but is adjustable appropriately according to the kind of the photosensitive sheet used. In this embodiment, light images from different optical axes 49, 60 are directed to the same exposure section P1. This method enables heating of the exposure section P1 by only one heater 7, thus allowing cost and space saving and easy control of the heater.

The photosensitive sheet 2 which is exposed to the reflecting light from the document or the translucent light through the slidefilm at the exposure section P1 to form a latent image is transferred to the pressure developing section P2 comprising a pressure rolier 12. An image receiving sheet 9 is fed to the pressure developing section P2 from a paper cassette 8 mounted on the right side of the copying machine via a suction type paper supply device 10 and a PS roller 11. The PS roller 11 starts rotating so as to enable the image receiving sheet 9 to overlap the latent image on the photosensitive sheet 2. These superimposed latent image on the photosensitive sheet and image receiving sheet 9 are pressed at the pressure developing section P2. The reference numeral S2 denotes a sensor to detect the image receiving sheet 9 at the position of the PS roller 11.

The pressure roller 12 composing the pressure developing section P2 is made to apply/release pressure by means of a pressure mechanism (not shown) comprising a spring and an eccentricity cam. The pressure roller 12 works to apply pressure when the pressure developing process starts and works to release pressure when the pressure developing process finishes. When the process is complete, the used photosensitive sheet 2 is wound on the takeup shaft 1b while the image receiving sheet 9 having the image thus transferred is fed to a glossing device 13. At the glossing device 13, the image receiving sheet 9 is heated and pressed not only to facilitate the coloring reaction of the chromogenic materials formed thereon but to cause the thermo plastic resin applied thereon to soften to cover the surface of the image giving glossiness to the produced image. The image receiving sheet 9 thus treated by the glossing device 13 is discharged to a paper ejection tray 14 provided on the left side of the copying machine.

Figure 4:
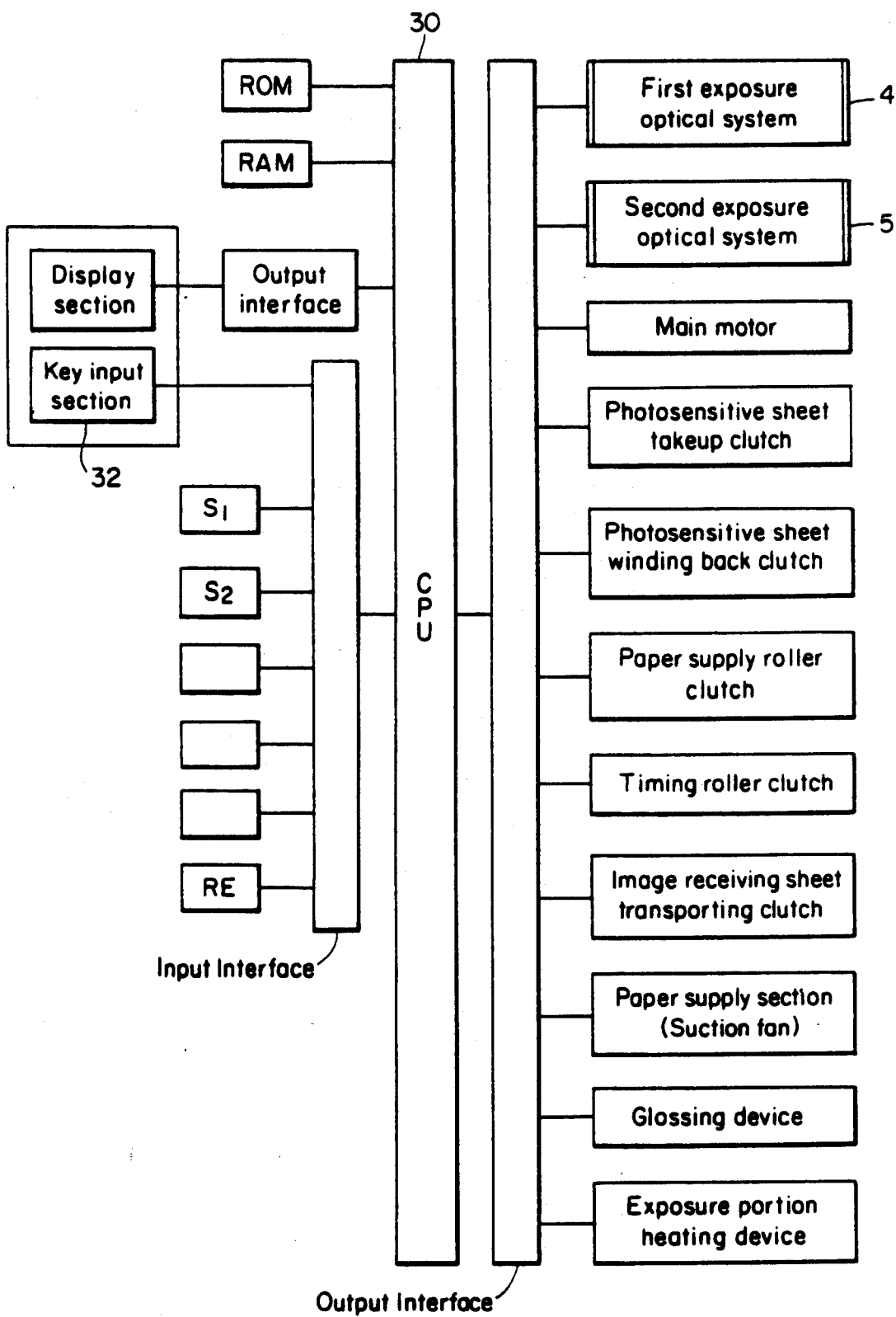
FIG. 4 is a block diagram of the copying machine of FIG. 1.

FIG. 4 is a block diagram illustrating a control section of the copying machine of this embodiment.

The copying machine as a whole is controlled by a CPU 30. Into the CPU 30 are input data from a key input section 32 on an operating panel 31 provided on the upper surface of the copying machine together with other information such as the temperature detected by the sensor S1, the condition of the image receiving sheet detected by the sensor S2, data detected by a rotary encoder (RE) which is disposed on the transporting roller 3 to detect the length of transported photosensitive sheet 2. The key input section 32 comprises a print switch to start copying, a selection key to select the first exposure optical system 4 or the second exposure optical system 5. The CPU 30 initiates operation of either system according to the input selection.

Figure 5:
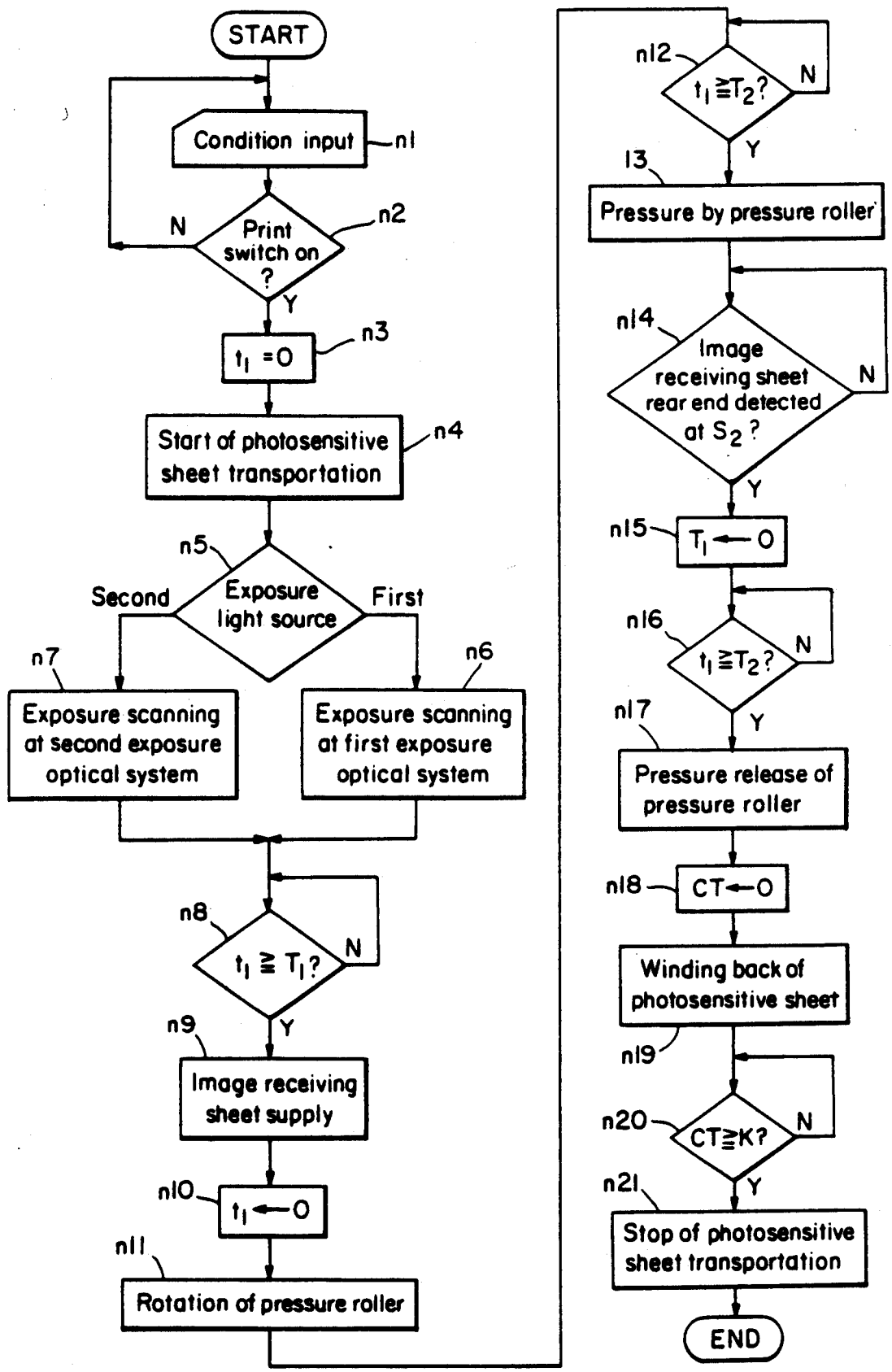
FIG. 5 is a flowchart illustrating the sequence of steps taken in the image forming process by the copying machine of FIG. 1.

FIG. 5 is a flowchart illustrating the procedure during the image formation process.

When the desired conditions such as the selection of exposure optical system are input and the print switch is turned on, transportation of the photosensitive sheet 2 starts followed by the exposure process (n1→n2→n3→n4→n5→n6, n7). The exposure process is made either by the first exposure optical system 4 or the second exposure optical system 5 depending on the input from the key input section 32 (n6, n7). The exposure process finishes when the scanning of the document or the slidefilm is complete.

After the time lapse of $T_1$ since the start of the exposure process, the PS roller 11 starts rotating to supply the image receiving sheet 9 (n8→n9). Since the distance between the PS roller 11 and the pressure developing section P2 is predetermined and the speed of transporting the image receiving sheet 9 is kept fixed, the image receiving sheet 9 arrives at the pressure developing section P2 after the fixed time lapse of $T_2$ (n10→n11→n12). At this time, the pressure roller 12 is set to apply pressure while rotating to press and transport the both sheets 2, 9 to perform the pressure developing process (n13). The image receiving sheet 9 is transported as the pressure roller 12 rotates. When the rear end of the image receiving sheet 9 is detected at the position of the PS roller 11, the pressure roller 12 is made to release the pressure after the time lapse of $T_2$ to complete the pressure developing process (n14→n15→n16→n17). As described above, $T_2$ is the time required for the image receiving sheet to arrive at the pressure developing section P2 from the position of the PS roller 11.

After the afore-described pressure developing process is complete, the image receiving sheet 9 is heated and pressed at the glossing device 13 before being discharged to the paper ejection tray 14. On the other hand, a predetermined length of the photosensitive sheet is wound back to the sheet supply shaft 1a. When the pressure developing process is complete, the rear end of the latent image on the photosensitive sheet is positioned on the pressure developing section P2, leaving the unused part of the photosensitive sheet behind the pressure developing section P2. Meanwhile, the next exposure process starts at the portion of the photosensitive sheet positioned on the exposure section P1. Thus, if the photosensitive sheet is left as it is when the pressure developing process is complete, the length of the photosensitive sheet between the pressure developing section P2 and the exposure section P1 will be wasted. To avoid this waste, the photosensitive sheet 2 is wound back in the processes of n18 to n21. First, a counter (CT) for memorizing the count of the rotary encoder (RE) is reset to count the number of RE when the photosensitive sheet 2 is wound back. When the count reaches a predetermined value, the winding back of the photosensitive sheet stops.

As described above, according to this invention, at the exposure process different optical axes are used to guide optical images from the document and from the slidefilm. As a result, the mode switching between the document and the slidefilm can be easily made without the trouble of resetting of the Fresnel lens or switching mirrors to change the optical axis. Furthermore, since the initial setting of each optical axis is kept unchanged, troubles such as dislocation of the optical axis caused by mirror switching are prevented.

Furthermore, according to this invention, the slidefilm is intercepted from the light source and only the necessary part thereof is exposed to light at the necessary time by means of the slit, preventing excessive temperature rise on the surface of the slidefilm and therefore discoloration and deterioration thereof.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A copying machine comprising a first exposure optical system having a first optical axis along which an optical image is directed from a first document to an exposure section, a second exposure optical system having a second optical axis along which an optical image is directed from a second document to said exposure section, and means for selecting either said first exposure optical system or said second exposure optical system, the first exposure optical system being disposed so that the first optical axis forms the same angle against the first document as against a photosensitive material at the exposure section, the second exposure optical system being disposed so that the second optical axis is at the same angle to the second document and the photosensitive material placed at the exposure section.

2. A copying machine according to claim 1, further comprising a slidefilm exposure device having a slit disposed between a light source and a slidefilm, and means for supporting said slidefilm or slit so that it is transversely movable.

* * * * *